US012605963B2

(12) United States Patent
Collini et al.

(10) Patent No.: US 12,605,963 B2
(45) Date of Patent: Apr. 21, 2026

(54) RIM FOR VEHICLE WHEEL

(71) Applicant: TITAN ITALIA S.P.A., Finale Emilia (IT)

(72) Inventors: Massimo Collini, Brescia (IT); Paolo Bertoglio, Bologna (IT); Danilo Falegnami, Ferrara (IT)

(73) Assignee: TITAN ITALIA S.P.A., Bologna (IT)

( * ) Notice: Subject to any disclaimer, the term of this patent is extended or adjusted under 35 U.S.C. 154(b) by 741 days.

(21) Appl. No.: 17/972,723

(22) Filed: Oct. 25, 2022

(65) Prior Publication Data

US 2024/0042797 A1     Feb. 8, 2024

(30) Foreign Application Priority Data

Aug. 5, 2022     (EP) ..................................... 22189111
Aug. 5, 2022     (IT) ........................ 102022000016878

(51) Int. Cl.
B60B 21/10          (2006.01)
B60B 21/02          (2006.01)

(52) U.S. Cl.
CPC ............ B60B 21/102 (2013.01); B60B 21/02 (2013.01)

(58) Field of Classification Search
CPC ..... B60B 21/02; B60B 21/026; B60B 21/028; B60B 21/102
See application file for complete search history.

(56) References Cited

U.S. PATENT DOCUMENTS

| | | | |
|---|---|---|---|
| 8,991,938 B2 | 3/2015 | Brame et al. | |
| 2011/0298271 A1* | 12/2011 | Cragg ....................... | B60B 3/16 |
| | | | 301/95.101 |
| 2018/0162159 A1* | 6/2018 | Brame ...................... | B60B 3/04 |
| 2022/0144013 A1* | 5/2022 | Nilsson ................. | B60B 21/102 |

FOREIGN PATENT DOCUMENTS

| | | |
|---|---|---|
| CN | 113665291 A | 11/2021 |
| DE | 102011121596 B4 | 12/2020 |
| GB | 2595217 A | 11/2021 |
| WO | 2007/042813 A1 | 4/2007 |
| WO | 2017/195099 A1 | 11/2017 |
| WO | 2022/159045 A1 | 7/2022 |

OTHER PUBLICATIONS

Jan. 20, 2023 Search Report issued in European Patent Application No. 22189111.2.
Mar. 30, 2023 Search Report and Written Opinion issued in Italian Patent Application No. 202200016878.

* cited by examiner

*Primary Examiner* — S. Joseph Morano
(74) *Attorney, Agent, or Firm* — Oliff PLC

(57) ABSTRACT

A wheel rim, in particular for a wheel of an agricultural vehicle is disclosed, in which an annular body comprises a central annular portion extending around an axis, two peripheral annular portions for coupling with the beads of a tyre and two intermediate annular portions that connect the two peripheral annular portions to the central annular portion, each intermediate annular portion comprises a tilted wall with an external frustoconical surface that forms an angle α with a plane that is perpendicular to the aforesaid axis.

13 Claims, 5 Drawing Sheets

RIM FOR VEHICLE WHEEL

BACKGROUND OF THE INVENTION

The present invention relates to a wheel rim, in particular a rim for a wheel of a vehicle.

Specifically, but not exclusively, the present invention can be advantageously applied to an agricultural vehicle.

In particular, reference is made to a wheel rim made according to the preamble to the first claim. Such a rim is already known, for example from patent application WO 2017/195099 A1.

Various aspects of the prior art are improvable. Firstly, it is desirable to have available a rim that makes the assembly of the wheel easier and more practical (which includes, as is known, fitting the tyre on the rim) than the rims described in WO 2017/195099. Secondly, it is desirable to reduce the risk of damage to the tyre, like abrasions or the like (in particular, to the beads of the tyre), during assembly. Another limit of the prior art lies in the fact that the structure of the rim is weakened especially in certain zones like, for example, in the welding zones of an additional element (as disclosed in WO 2017/195099 A1), or in the zones connected to curvature radiuses that are such as to cause relatively high necking in the step of forming the rim.

SUMMARY OF THE INVENTION

One object of the invention is to propose a rim that is able to overcome one or more of the aforesaid limits and drawbacks of the prior art.

One object of the invention is to provide an alternative solution to the problem of providing a wheel rim on which to assemble a tyre.

One advantage is to make a rim onto which it is possible to fit a tyre in a particularly easy and practical manner.

One advantage is to enable a tyre to be fitted to the rim without risk of damage to the tyre, in particular to the beads thereof.

One advantage is gradual and reliable positioning of the tyre in a correct position on the rim during the inflation step.

One advantage is to create a rim with a relatively robust structure, in particular a rim made in one piece (without additional elements made on a base body) and/or devoid of zones with high necking.

One advantage is to make available a wheel rim, in particular for a vehicle wheel, which is constructionally simple and cheap.

Such objects and advantages and yet others, are achieved by a wheel rim according to one or more of the claims set out below. In particular, the independent claim discloses a rim according to the invention and the appended claims disclose particularly advantageous forms of the invention.

In one embodiment, a wheel rim comprises an annular body with a central annular portion extending around an axis, two peripheral annular portions for coupling with the beads of a tyre and two intermediate annular portions that connect the two peripheral annular portions to the central annular portion, in which each intermediate annular portion comprises a tilted wall with an external frustoconical surface that forms an angle $\alpha$ with a plane that is perpendicular to the aforesaid axis, in which the angle $\alpha$ is less than 58°, for example comprised in the range 50°±5°, and the central connecting wall comprises an external convex annular surface connected to the aforesaid frustoconical surface.

BRIEF DESCRIPTION OF THE DRAWINGS

The invention can be better understood and implemented with reference to the attached drawings that illustrate embodiments thereof by way of non-limiting example, in which.

DETAILED DESCRIPTION

Figure 1:
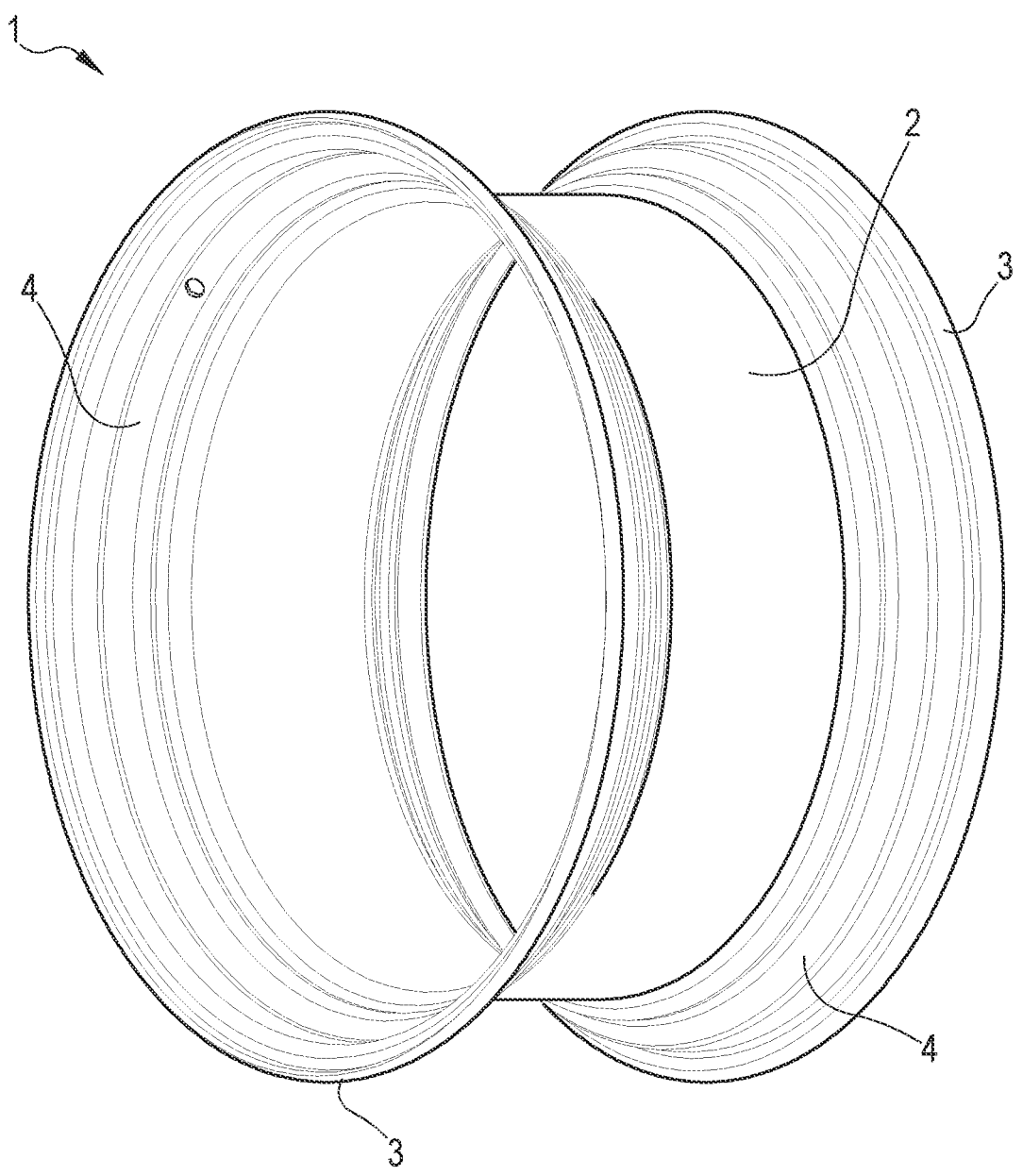
FIG. 1 shows a perspective view of a first embodiment of a wheel rim made according to the present invention.
Figure 2:
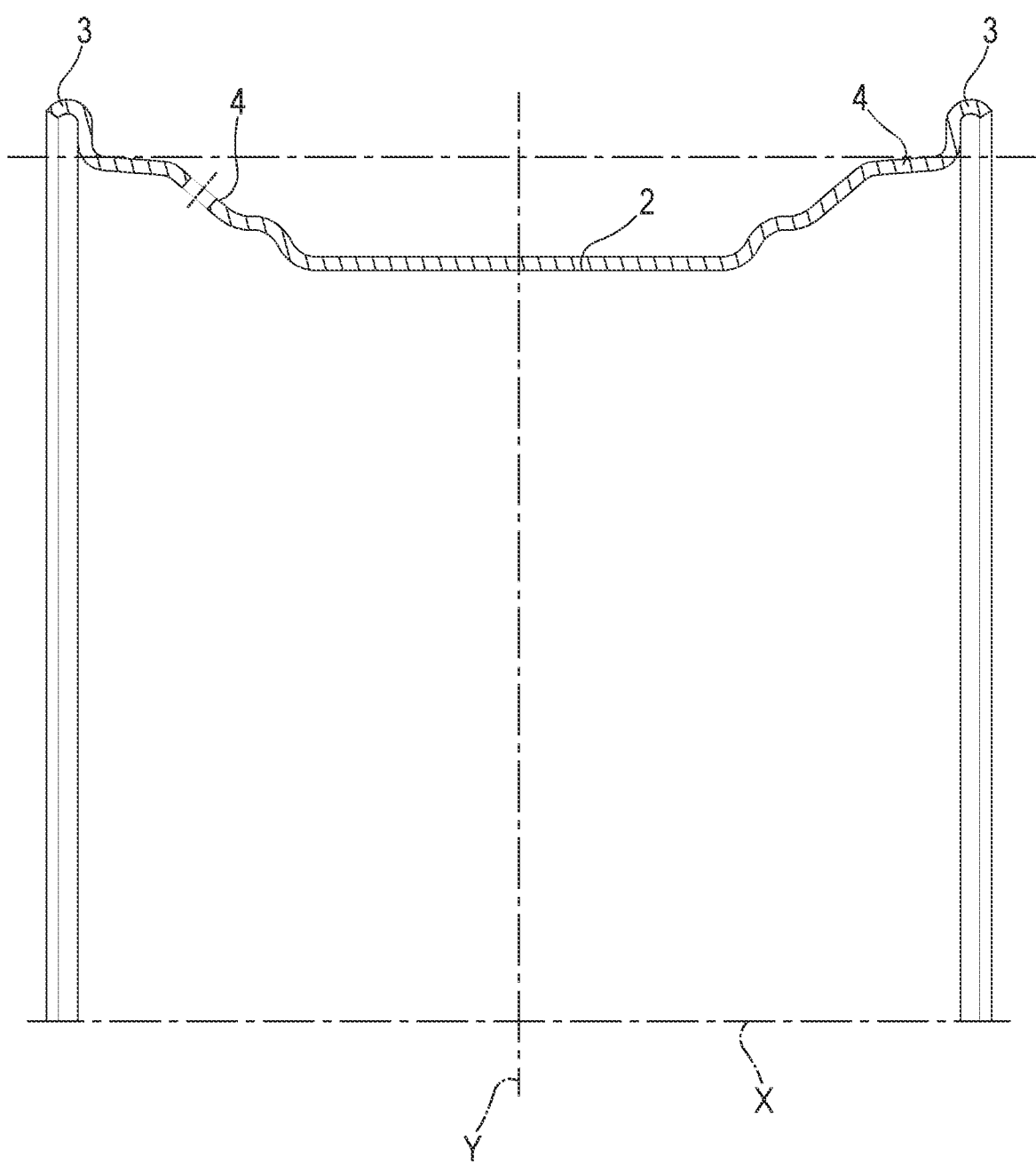
FIG. 2 shows a half section of the rim of FIG. 1 along a section plane passing through the axis of rotation of the wheel.
Figure 3:
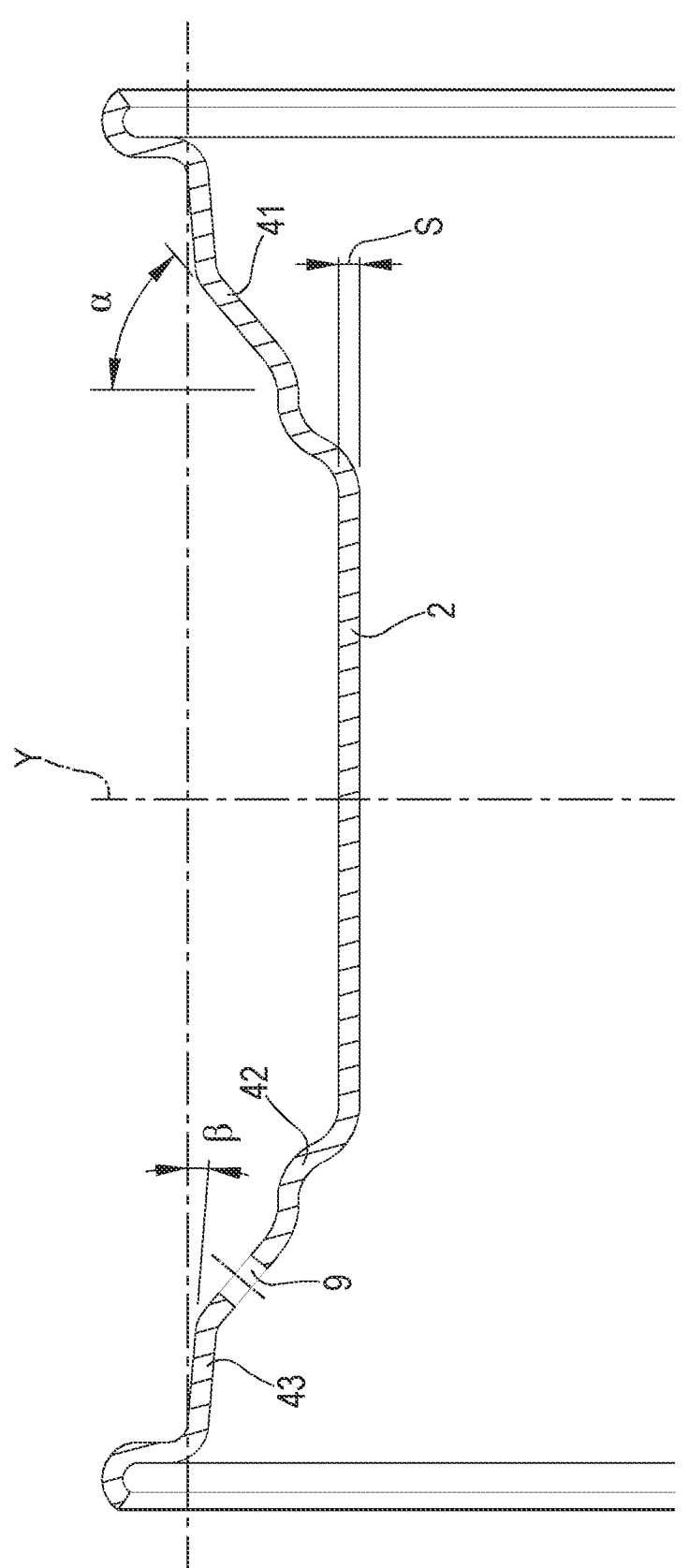
FIG. 3 shows an enlarged detail of FIG. 2.
Figure 4:
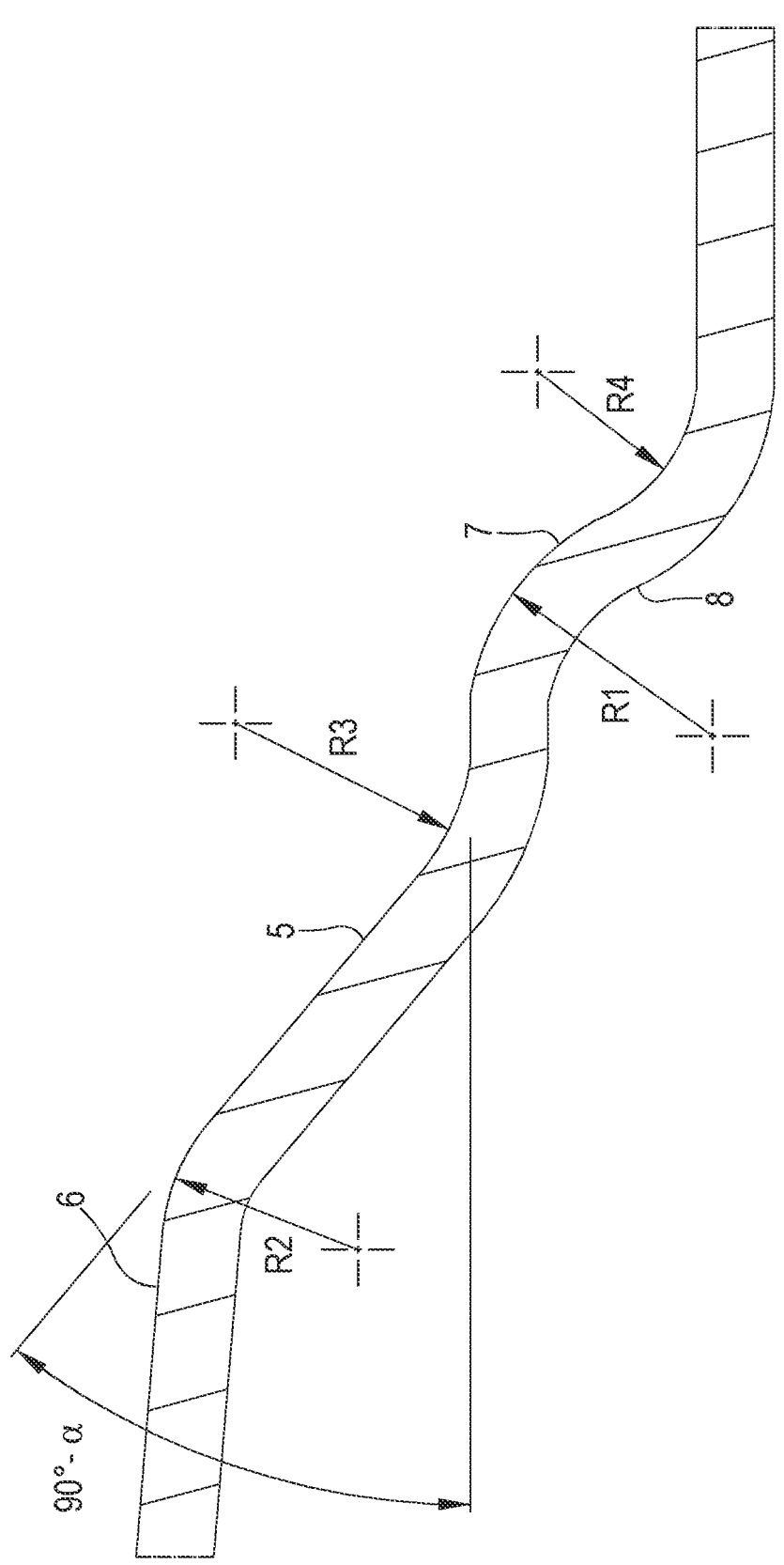
FIG. 4 shows an enlarged detail of FIG. 3.

With reference to the aforesaid figures, identical elements of different embodiments have been indicated, for simplicity of representation, by the same number. With 1, a wheel rim has been indicated overall, in particular usable for a wheel of a vehicle like, for example, an agricultural vehicle. The wheel may comprise, in particular, a tyre that has to be fitted to the rim 1.

The rim 1 may comprise, in particular, an annular body. The annular body may be made, in particular, in a single piece (as in the illustrated embodiment), for example in pressed sheet metal. The annular body may be made, in particular, by cold plastic deformation of a semifinished workpiece.

The annular body may comprise, in particular, a central annular portion 2. The central annular portion 2 may, in particular, extend around an axis X. The axis X may substantially coincide, in particular, with the axis of rotation of the assembled wheel. The central annular portion 2 may comprise, in particular, an external revolution surface extending around the axis X and/or an internal revolution surface extending around the axis X (where "external" and "internal" refers to the axis X). The central annular portion 2 may be, as in this specific example, of cylindrical shape. The central annular portion 2 may be, in particular, configured for enabling a wheel hub to be inserted that will be connected to the rim (by connecting means, for example of known type). The central annular portion 2 may have a thickness S that is the same, in particular, as a value comprised in the range 6±3 mm, or in the range 6±2 mm, or in the range 6±1 mm.

The annular body may be shaped, in particular, in a symmetrical (specular) manner around a plane Y of symmetry perpendicular to the axis X.

The annular body may comprise, in particular, two peripheral annular portions 3 located on two sides opposite (in an axial direction) with respect to the central annular portion 2. Each peripheral annular portion 3 is more distant from the axis X than the central annular portion 2. The two peripheral annular portions 3 are configured, in particular, for coupling with the two beads of a tyre. Each peripheral annular portion 3 may comprise, in particular, an edge extending radially (with reference to the axis X) configured for retaining the tyre on the rim 1 in an assembled configuration of the wheel.

The annular body may comprise, in particular, two intermediate annular portions 4. Each intermediate annular portion 4 is arranged for joining the central annular portion 2 to a respective peripheral annular portion 3. Each intermediate annular portion 4 may be, in particular, more distant from the aforesaid axis X than the central annular portion 2. Each peripheral annular portion 3 may be, in particular, more distant from the aforesaid axis X than the respective intermediate annular portion 4.

Each intermediate annular portion 4 may comprise, in particular, a tilted wall 41, a central connecting wall 42 and a peripheral connecting wall 43. For each intermediate annular portion 4, the respective central connecting wall 42 may be configured, in particular, for joining the respective tilted wall 41 to the central annular portion 2. For each intermediate annular portion 4, the respective peripheral connecting wall 43 may be configured, in particular, for joining the respective tilted wall 41 to the respective peripheral annular portion 3. For each intermediate annular portion 4, the respective peripheral connecting wall 43 may be, in particular, more distant from the aforesaid axis X than the respective central connecting wall 42.

For each intermediate annular portion 4, the respective tilted wall 41 comprises a frustoconical surface 5 facing radially outwards, where "radially" means with reference to the aforesaid axis X. The external frustoconical surface 5 of each tilted wall 41 forms an angle α with a plane that is perpendicular to the aforesaid axis X. This angle α may be, in particular, less than 60°. This angle α may be, in particular, less than 58°. This angle α may be, in particular, less than 55°. This angle α may be, in particular, greater than 40°. This angle α may be, in particular, greater than 40° and less than 60°. This angle α may be, in particular, comprised in the range α=50°±8°. This angle α may be, in particular, comprised in the range α=50°±6°. This angle α may be, in particular, comprised in the range α=50°±4°. This angle α may be, in particular, comprised in the range α=50°±2°. This angle α may be, as in the specific embodiment illustrated, comprised in the range 50°±1°.

For each intermediate annular portion 4, the respective peripheral connecting wall 43 may comprise, in particular, a frustoconical surface 6 facing radially outwards. For each intermediate annular portion 4, the frustoconical surface 6 of the respective peripheral connecting wall 43 forms an angle β with a direction parallel to the aforesaid axis X. This angle β may be, in particular, less than 10°. This angle β may be, in particular, comprised in the range β=5°±3°. This angle β may be, in particular, comprised in the range β=5°±2°. This angle β may be, in particular, comprised in the range β=5°±1°. This angle β may be, as in this specific embodiment, equal to 5°. For each intermediate annular portion 4, the frustoconical surface 6 of the respective peripheral connecting wall and the frustoconical surface 5 of the respective tilted wall 41 may form, in particular, an angle comprised between 30° and 40°, or an angle comprised in the range 35°±3°, or an angle comprised in the range 35°±1°.

For each intermediate annular portion 4, the frustoconical surface 6 of the respective peripheral connecting wall and the frustoconical surface 5 of the respective tilted wall 41 are coaxial to one another, both extending around the axis X.

For each intermediate annular portion 4, the respective central connecting wall 42 may comprise, in particular, a convex annular surface 7 facing radially outwards and/or a concave annular surface 8 facing radially inwards. For each intermediate annular portion 4, the respective central connecting wall 42 has a thickness S1 (in particular S1=S), for example a thickness S1 equal to a value comprised in the range 6±3 mm, or in the range 6±1 mm.

The rim 1 may comprise, in particular, a valve hole 9 arranged on one of the two tilted walls 41.

A convexity of the convex annular surface 7 of each central connecting wall 42 may have, in particular, a radius of curvature R1 (measured on a section plane passing through the axis X). It is possible to provide, in particular, R1>1.5*S1, or R1>1.8*S1, or R1>2.0*S1, R1>2.2*S1. It is possible to provide, in particular, R1<4.0*S1, or R1<3.5*S1, or R1<3.0*S1, or R1<2.5*S. It is possible to provide, in particular, 1.5*S1<R1<3.0*S1. It is possible to provide, in particular, 1.8*S1<R1<2.8*S1, or 2.0*S1<R1<2.5*S1. It is possible to provide, in particular, for R1 being comprised in the range 14±2 mm.

For each intermediate annular portion 4, the respective tilted wall 41 has a thickness S2 (in particular, S2=S1), for example a thickness S2 equal to a value comprised in the range 6±3 mm, or in the range 6±1 mm. The external frustoconical surface 6 of each peripheral connecting wall 43 may be, in particular, connected to the external frustoconical surface 5 of the respective tilted wall 41 by means of an annular connecting surface with a radius of curvature R2 (measured on a section plane passing through the axis X). It is possible to provide, in particular, 1.5*S2<R2<2.5*S2. It is possible to provide, in particular, 1.8*S2<R2<2.2*S2. It is possible to provide, in particular, for R2 being comprised in the range 12±2 mm.

The external convex annular surface 7 of each central connecting wall 42 may be, in particular, connected to the external frustoconical surface 5 of the respective tilted wall 41 by means of an annular connecting surface with a radius of curvature R3 (measured on a section plane passing through the axis X). It is possible to provide, in particular, 1.5*S2<R3<3.0*S2. It is possible to provide, in particular, 1.8*S2<R3<2.5*S2. It is possible to provide, in particular, for R3 being comprised in the range 13±2 mm.

For each intermediate annular portion 4, the external convex annular surface 7 of the respective central connecting wall 42 may be, in particular, connected to an external surface of the central annular portion 2 by means of an annular connecting surface with a radius of curvature R4. It is possible to provide, in particular, 1.2*S<R10<2.0*S. It is possible to provide, in particular, 1.4*S<R10<1.8*S. It is possible to provide, in particular, for R4 being comprised in the range 10±2 mm.

Figure 5:
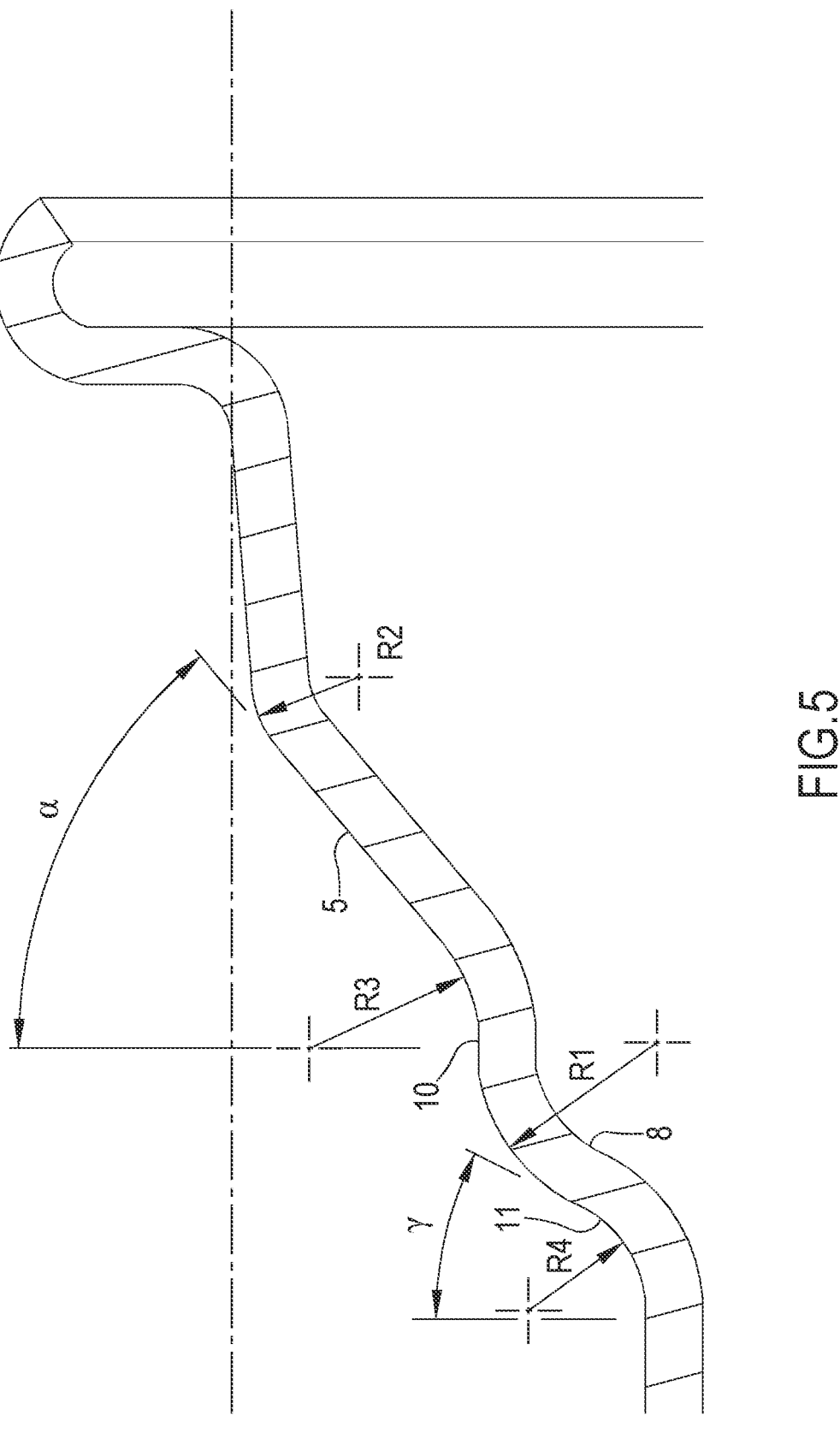
FIG. 5 shows a section of a detail of a second embodiment of a wheel rim made according to the present invention.

For each intermediate annular portion 4, it is possible to provide (as in the embodiment of FIG. 5) a first external connecting surface 10 connecting the annular connecting surface to the radius of curvature R3 and the annular connecting surface to the radius of curvature R1. The first external connecting surface 10 may be, in particular, of cylindrical shape with an axis coinciding with the axis X. The first external connecting surface 10 may have, in particular, a relatively reduced axial dimension, for example of a few tenths of a millimetre. Each first connecting external surface 10 may be, in particular, arranged between the respective convex annular surface 7 and the frustoconical surface 5 of the respective tilted wall 41.

For each intermediate annular portion 4, it is possible to provide (as in the embodiment of FIG. 5) a second external connecting surface 11 connecting the annular connecting surface to the radius of curvature R1 and the annular connecting surface to the radius of curvature R4. The second external connecting surface 11 may be, in particular, of frustoconical shape around the axis X, forming an angle γ with a plane that is perpendicular to the axis X. This angle γ may be comprised, in particular, in the range 20°±5°, or in the range 20°±2°. The second external connecting surface 11 may have, in particular, a relatively reduced axial dimension, for example of a few tenths of a millimetre. Each second external connecting surface 11 may be, in particular, arranged between the respective convex annular surface 7 and the central annular portion 2.

It is observed that the various sections of the annular body may have thicknesses that are the same as one another. In particular, the thickness S of the central annular portion 2 may be equal to the thickness S1 of the central connecting wall 42 and/or to the thickness S2 of the tilted wall 41 and/or to the thickness S3 of the peripheral connecting wall 43 and/or to the thickness S4 of the peripheral annular portion 3.

The particular combination of the convex annular surface 7 and of the frustoconical surface 5, in which the convex annular surface 7 is connected on a side outside the frusto-conical surface 5 and on a side inside the central annular portion 2, and in which the tilt of the frustoconical surface 5 is such as to form the aforesaid angle α, enables the following technical advantages to be unexpectedly achieved.

Firstly, the task of assembling the wheel is facilitated owing to the fact that the tyre is inserted into the rim practically and immediately in a position that is suitable for performing the subsequent assembly steps.

Secondly, during the step of inflating the tyre positioned on the wheel, the tyre settles so naturally and gradually as to significantly reduce the risk of damage to the tyre like, for example, abrasions or excessive stress on the beads.

Another advantage lies in the fact that the connecting surfaces between the various sections of the annular body made by pressing a single piece by cold deformation have radiuses of curvature (R1, R2, R3, R4) that as has been established cause relatively small necking, so that the pressed annular body that is obtained is provided with great resistance to wear.

The invention claimed is:

1. A wheel rim, said rim comprising:

an annular body including a central annular portion, two peripheral annular portions and two intermediate annular portions, said central annular portion extending around an axis and being configured for arrangement around a wheel hub, said two peripheral annular portions being located on two sides that are axially opposite said central annular portion, each peripheral annular portion being more distant from said axis than said central annular portion and being configured for coupling with a bead of a tyre, each intermediate annular portion being arranged to join said central annular portion to a respective peripheral annular portion, each intermediate annular portion including:

a tilted wall;

a central connecting wall that joins said tilted wall to said central annular portion; and a peripheral connecting wall that joins said tilted wall to the respective peripheral annular portion, said peripheral connecting wall being more distant from said axis than said central connecting wall, said tilted wall defining a frustoconical surface facing radially outward relative to said axis, wherein:

said frustoconical surface of said tilted wall forms an angle α with a plane that is perpendicular to said axis and said central connecting wall comprises an external convex annular surface facing radially outwards and connected on one side to said frustoconical surface of said tilted wall and on one axially opposite side to said central annular portion;

said angle α is included in a range α=50°+4°, said tilted wall has a thickness S2 said peripheral connecting wall defines an external frustoconical surface facing radially outwards and being connected to said external frustoconical surface of said tilted wall by means of an annular connecting surface with a radius of curvature R2, being 1.5*S2<R2<2.5*S2, and said frustoconical surface of said peripheral connecting wall forms an angle β with a direction parallel to said axis, such that angle β=5°±3°.

2. The wheel rim according to claim 1, wherein said angle α is included in the range α=50°+2°.

3. The wheel rim according to claim 1, wherein said external convex annular surface of said central connecting wall is connected to said external frustoconical surface of said tilted wall by means of an annular connecting surface with a radius of curvature R3, being 1.5*S2<R3<3.0*S2.

4. The wheel rim according to claim 3, wherein 1.8*S2<R3<2.5*S2.

5. The wheel rim according to claim 1, wherein said central connecting wall comprises a concave annular surface facing radially inwards.

6. The wheel rim according to claim 1, wherein said radius of curvature R2 is 1.8*S2<R2<2.2*S2.

7. The wheel rim according to claim 1, wherein said central connecting wall has a thickness S1 and wherein a convexity of said external convex annular surface of said central connecting wall has a radius of curvature R1, being 1.5*S1<R1<3.0*S1.

8. The wheel rim according to claim 1, wherein said central annular portion has a thickness S and wherein said external convex annular surface of said central connecting wall is connected to an external surface of said central annular portion by an annular connecting surface with a radius of curvature R4, being 1.2*S<R4<2.0*S.

9. The wheel rim according to claim 1, wherein each intermediate annular portion comprises a first external surface of cylindrical shape coaxial with said axis, said first external surface being arranged to join said external convex annular surface to said frustoconical surface of said tilted wall.

10. The wheel rim according to claim 1, wherein said angle β is defined as β=5°±2°.

11. The wheel rim according to claim 1, wherein said angle β is defined as β=5°±1°.

12. The wheel rim according to claim 1, wherein said frustoconical surface of said peripheral connecting wall and said frustoconical surface of said tilted wall form an angle in a range of 35°±3°.

13. The wheel rim according to claim 1, wherein said frustoconical surface of said peripheral connecting wall and said frustoconical surface of said tilted wall form an angle in a range of 35°±1°.

* * * * *